(No Model.)

R. C. WHAYNE.
LAMP BRACKET FOR VELOCIPEDES.

No. 571,101. Patented Nov. 10, 1896.

WITNESSES:
Wm. J. Henning
Edna F. Johnson

INVENTOR
R. C. Whayne
BY
Elliott & Hopkins
ATTORNEYS.

United States Patent Office.

ROBERT COLEMAN WHAYNE, OF LOUISVILLE, KENTUCKY.

LAMP-BRACKET FOR VELOCIPEDES.

SPECIFICATION forming part of Letters Patent No. 571,101, dated November 10, 1896.

Application filed November 16, 1895. Serial No. 569,141. (No model.)

*To all whom it may concern:*

Be it known that I, ROBERT COLEMAN WHAYNE, a citizen of the United States, residing at Louisville, in the county of Jefferson and State of Kentucky, have invented certain new and useful Improvements in Lamp-Brackets for Velocipedes, of which the following is a full, clear, and exact specification.

My invention relates to that class of lamp-brackets employed on bicycles and other vehicles for supporting the lamp or lantern, and it has more especial reference to that species of such brackets employed for supporting the lamp at the lower end of the front fork, a species commonly known as a "hub" or "axle" bracket.

The object of the invention is to provide an improved and simple form of bracket which may be readily attached to the hub or axle of the front wheel without removing the nut or tap therefrom, and which will prevent the weight of the lamp from tipping the bracket forward and unscrewing the nut.

With these ends in view my invention consists in certain features of novelty in the construction, combination, and arrangement of parts hereinafter described with reference to the accompanying drawings, and more particularly pointed out in the claims.

Figure 1:
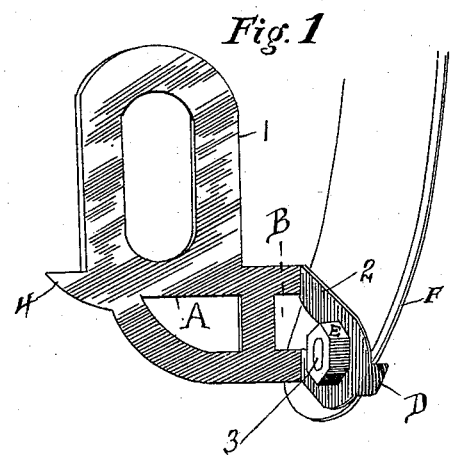
Figure 2:
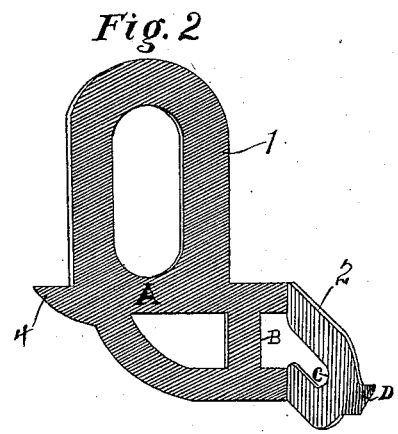

In the said drawings, Figure 1 is a perspective view of my improved bracket in position on the axle, also showing a portion of the front fork; and Fig. 2 is a perspective view of the bracket detached.

In carrying out my invention I employ a plate A, which is bent to form two angular portions 1 2, at substantially right angles to each other and both arranged in substantially vertical planes, the portion or angle 1 projecting in an upright or vertical direction for insertion into the socket of the lamp, while the other, 2, is projected substantially horizontally and is provided with a slot C for the reception of the bolt or axle 3, which passes through the hub of the front wheel and also through the front fork F. This slot C at one end has an enlargement B, which extends a short distance around the bend of the angle 2 and into the main body of the plate A, and which enlargement B is for the reception or passage of the axle-nut E, whereby the bracket may be secured on the axle 3 by partially unscrewing the nut E, then slipping the bracket onto the axle with the nut passing through the enlargement B and resting against the outer side of the member or angle 2, the axle or bolt 3 being embraced by the narrow portion of the slot C, as shown in Fig. 1. After the bracket is thus inserted over the axle the nut may be tightened up, so as to firmly clamp the portion 2 of the bracket between the nut and the outer side of the fork F.

In order that the forward tipping of the bracket and the consequent unscrewing of the nut E may be prevented, the rear end of the horizontal angle 2 is provided with a lug or flange D, which fits against the rear side of the fork F, as shown in Fig. 1, and thus holds the bracket from rotating on the axle 3.

The outer edge of the member 1 is provided with a projection or lug 4, which comes against the under end of the lamp-socket and prevents the lamp from tipping sidewise.

With a lamp-bracket thus constructed it will be seen that the lamp may be adjusted at any desired angle with reference to the surface of the road, so that the light can be thrown a greater or less distance in front of the rider, as may be required. This adjustment is afforded by the elongated slot C in the arm 2, in conjunction with the rear lug D, because, as is readily seen, the presence of this slot permits the lug D to be raised higher up on the fork F and thus lower the member 1 and thereby change its angle with reference to the horizontal. When the device has been adjusted to the proper angle, the retightening of the nut E will hold it in the desired position, although the rear end of the slot C may not be against the axle or bolt 3, but the bracket will nevertheless be held from tipping forward by means of the lug D, which, under all conditions, bears against the fork F.

I am aware that it has heretofore been proposed to pivotally connect a lamp-bracket to the side of the front fork of a bicycle and to hold such bracket from turning on said pivot, excepting at such times when it is desired to adjust it, by means of the front axle bolt, which is passed through a slot in the bracket, the end nut on the bolt being utilized for clamping the bracket firmly against the side of the fork, but in such prior constructions the said slot in the bracket is necessarily formed on an arc which is struck from the pivotal point of the bracket, and consequently the rigidity of the bracket depends solely upon the pressure of the nut on the axle, and should such nut become loose the weight of the lamp would force the outer end of the bracket downward. Therefore the said construction is not the equivalent of my invention, inasmuch as in my invention the slot through which the axle-bolt passes extends transversely of an arc struck from the lug D as a center, and consequently, even though the nut E should loosen, the weight of the lamp could not effect the depression of the forward end of the bracket, or at all events the rigidity of the bracket in my invention does not depend solely upon the clamping-power of the nut E.

Having thus described my invention, what I claim as new, and desire to secure by Letters Patent, is—

1. As a new and useful article of manufacture, a lamp-bracket having means for the attachment thereto of the lamp in combination with an arm having a laterally-elongated slot for the passage of the axle or bolt of the wheel and a lug for engaging with the rear side of the fork, said slot being extended across an arc struck from said lug as a center, whereby the angle of inclination of the bracket may be varied and the weight of the lamp will be supported by the pressure of said lug against the fork and the pressure of the edge of said slot upon the axle-bolt, substantially as set forth.

2. As a new and useful article of manufacture a lamp-bracket having means for the attachment thereto of the lamp in combination with an arm or member having a slot enlarged at one end for the passage of the axle-nut and the reception of the axle, said arm being provided with a laterally-projecting lug or flange for engagement with the wheel-fork, substantially as set forth.

3. As a new and useful article of manufacture a lamp-bracket consisting of a plate having the upright angle 1 for the reception of the lamp-socket, the horizontal arm or angle 2 provided with a slot having an enlargement extending through the bend of said arm and partially into the main body of the plate, said arm 2 being provided at its rear end with a lateral lug or flange for engagement with the fork, substantially as set forth.

ROBERT COLEMAN WHAYNE.

Witnesses:
F. A. HOPKINS,
EDNA B. JOHNSON.